United States Patent [19]

Rikon et al.

[11] 4,335,153

[45] Jun. 15, 1982

[54] IMITATION COCOA POWDER AND METHOD OF PREPARING SAME

[75] Inventors: Steven M. Rikon, Strongsville, Ohio; Frank del Valle, St. Ann, Ill.

[73] Assignee: SCM Corporation, New York, N.Y.

[21] Appl. No.: 156,618

[22] Filed: Jun. 5, 1980

Related U.S. Application Data

[63] Continuation-in-part of Ser. No. 46,156, Jun. 5, 1979, abandoned.

[51] Int. Cl.$^3$ .............................................. A23G 1/00
[52] U.S. Cl. ................................. 426/540; 426/593; 426/618; 426/631; 426/650
[58] Field of Search ................. 426/549, 96, 99, 307, 426/631, 618, 650, 660, 584, 589, 593, 540

[56] References Cited

U.S. PATENT DOCUMENTS 4,119,740 10/1978 Crespo ................................ 426/584

FOREIGN PATENT DOCUMENTS 2010657 7/1979 United Kingdom .................. 426/19

*Primary Examiner*—Raymond N. Jones
*Assistant Examiner*—Elizabeth A. Hatcher
*Attorney, Agent, or Firm*—Richard H. Thomas

[57] ABSTRACT

A formulation and process for the preparation of imitation cocoa powder containing fat, flavor, and a mixture of finely ground, bland flours and, optionally, colorant, in proportion to provide essentially the same carbohydrate, protein, fiber, ash, water and fat content as natural cocoa powder. The imitation cocoa powder of the present invention can be substituted for natural cocoa powder on a 100% pound-for-pound basis to duplicate the organoleptic and functional properties of products containing natural cocoa powder.

The present invention also resides in the formulation of a cocoa powder base employed in the preparation of the imitation cocoa powder and in confectionery, dairy, bakery and chocolate liquor products containing the imitation cocoa powder.

15 Claims, No Drawings

IMITATION COCOA POWDER AND METHOD OF PREPARING SAME

This application is a continuation-in-part of prior application Ser. No. 046,156 filed June 5, 1979, now abandoned and assigned to assignees of the present application.

The present invention relates to an imitation cocoa powder and method of preparation of the same. Specifically, the present invention relates to an imitation cocoa powder having the physico-chemical and functional properties of natural cocoa powder, such that it is capable of replacing natural cocoa powder on a 100% pound-for-pound basis in formulations using cocoa powder.

The present invention also relates to a novel base useful in the preparation of cocoa powder, and to products containing the cocoa powder of the present invention.

BACKGROUND OF THE INVENTION

Cocoa is obtained from the roasted-cured kernels of ripe seeds of Theobroma Cacao Linne, and other species of Theobroma. The roasted kernels are ground to a smooth paste to produce chocolate liquor having a high fat content, and the liquor is then passed through hydraulic filter presses to remove part of the fat, which is sold as cocoa butter. Thereafter, the resulting press cake is pulverized to obtain fine cocoa powder. Typically commercial cocoa powders range in fat content from a low of 8% to a high of 24%. Also typically, cocoa powders employed in confectioner coatings contain 10-12% fat.

Cocoa powder is brownish in color having a chocolate odor and taste, and can be used directly as a foodstuff or as a flavoring agent. A reconstitutable chocolate drink product, for example, is prepared essentially from cocoa powder and a sweetening agent. The chocolate drink product may also include other ingredients such as milk solids, vitamins, iron salts or other flavoring agents such as ground spice, vanilla bean, vanillin, coumarin, salt and the like. Confectionery coatings typically may be comprised of a hard butter, cocoa powder, sugar, salt, lecithin, vanillin and, in the case of milk coatings, whole milk powder, or non-fat dry milk solids and butter oil. Alternatively, confectioner coatings may be formulated from chocolate liquor, cocoa butter, sugar, salt, lecithin, vanillin, and in the case of milk chocolate, whole milk powder or non-fat milk solids and butter oil. In such formulations cocoa powder is indigenous to the chocolate liquor.

Products derived from cocoa bean, such as cocoa powder, and also chocolate liquor and cocoa butter, are products whose availability, unfortunately, and pricing level are subject to wide fluctuation. Particularly in recent years, substantial interest has developed in the preparation of imitation cocoa products due to rapid increase in price of the cocoa bean. However, up to the present time, the principal interest has been in the development of hard butters which function as replacers, extenders or substitutes for cocoa butter. An analogous, but unexploited situation exists for cocoa powder and chocolate liquor.

A number of products are available on the market as cocoa powder substitutes. These products, upon closer examination, are in actuality extenders. Examples are Cocoa-Max (trademark, Cargill, Inc., made from soy flour); Cocomost (trademark Coors Food Product Co., made from yeast), described in British patent application GB 2010657A; and Carob Powder ST-60 (trademark, Spring Tree Corporation). Two other products made by SGA Flavors and A. E. Staley Manufacturing Company are derived from toasted legumes and chemically modified starch, respectively. The latter product also appears to contain soy flour, water, fat, color and flavor in the proportions of about 83% flour and starch (in the ratio of about 2:1), 8% water, 7% fat (soybean, palm and cottonseed) and 2% color/flavor. Such products differ significantly from natural cocoa powder in one or more important characteristics, such as color, water solubility and proximate chemical composition. Data in the following Table 1 are illustrative, the criterion being a natural low fat cocoa powder marketed by Cacaofabrick DeZaan DV under the trademark N-11-N Natural Low Fat Cocoa Powder.*

*In this Table, the products listed, other than the DeZaan product, are commercially available cocoa powder substitutes. The values L, a and b represent color measurements as the eye sees them. "L" being a measure of lightness or darkness on a scale of zero to 100, from black to white, respectively. The measurement "a" is a red or green response departing from gray. The measurement "b" is a yellow or blue response; also departing from gray.

TABLE 1

Characteristics of Cocoa Powder Substitutes vs. Natural Cocoa Powder

| PRODUCT | A | | | Characteristics | | | | | | |
| --- | --- | --- | --- | --- | --- | --- | --- | --- | --- | --- |
| | L | a | b | B | C | D | E | F | G | H |
| Cacaofabrick DeZaan DV-N-11-N Natural Low Fat Cocoa Powder | 39 | 13 | 16 | 4 | 47 | 6 | 26 | 5 | 5 | 11 |
| Cargill, Inc. - Cocoa-Max, Tan Natural | 33 | 12 | 14 | 8 | 36 | 2 | 47 | 6 | 5 | 4 |
| Coors Food Product Co. - Cocomost | 43 | 8 | 14 | 4 | 43 | 4 | 44 | 7 | 1 | 1 |
| Spring Tree Corporation - Carob Powder ST-60 | 37 | 8 | 15 | 9 | 78 | 8 | 6 | 3 | 4 | 1 |
| San Giorgio Aromi Flavors, International - SGA Flavors - Cocoa Extender, 6537/S | 33 | 8 | 12 | 10 | 76 | 6 | 7 | 4 | 6 | 1 |
| A. E. Staley Manufacturing | 63 | 2 | 10 | 6 | 55 | 2 | 24 | 3 | 7 | 9 |

TABLE 1-continued

Characteristics of Cocoa Powder Substitutes vs. Natural Cocoa Powder

| PRODUCT | Characteristics | | | | | | | | |
|---|---|---|---|---|---|---|---|---|---|
| | A | | | B | C | D | E | F | G | H |
| | L | a | b | | | | | | | |
| Company - Cocoa Extender | | | | | | | | | | |

A Color, Hunterlab Color Difference Meter, Model D25D2 (L, a, b) Hunter Associates Laboratory
B Water solubility (grams dissolved/100 grams of water at about 20° C.)
C Carbohydrate (grams/100 grams of sample) by difference
D Fiber (grams /100 grams)
E Protein (grams/100 grams)
F Ash (grams/100 grams)
G Water (grams/100 grams)
H Fat (grams/100 grams)

Such extenders when substituted for cocoa powder 100% on a pound-for-pound basis produce confectioner coatings which tend to be deficient in many respects, for instance flavor, color and viscosity. Data in the following Table 2 are illustrative:

TABLE 2

Charcteristics of Confectioner Coatings Prepared from Cocoa Powder Substitutes vs. Natural Cocoa Powder at 6% Level

| Product | A | B | | | C |
|---|---|---|---|---|---|
| | | L | a | b | |
| DeZaan-N-11-N Natural Low Fat Cocoa Powder | G | 27 | 9 | 10 | 68 |
| Cargill-Cocoa-Max, Tan Natural | P | 31 | 9 | 11 | 79 |
| Coors-Cocomost | P | 29 | 7 | 11 | 65 |
| Spring-Tree-Carob Powder ST-60 | P | 25 | 7 | 9 | 37 |
| SGA-Flavors-Cocoa Extender 6537/S | P | 23 | 6 | 8 | 70 |
| A. E. Staley-Cocoa Extender | F | 44 | 4 | 10 | 57 |

A Flavor Quality (Good, G; Fair, F; Poor, P)
B Coating Color (Hunterlab L, a, b)
C Viscosity (Degrees MacMichael at 120° F.)**
**As determined on a Fisher-MacMichael Viscosimeter using a No. 26 spindle wire at 15 r.p.m.

In addition, a number of products have been introduced on the market as chocolate flavors. These are more in the nature of additives to various food items for the purpose of obtaining a chocolate flavor.

For purposes of the present application, the term "imitation cocoa powder" shall mean a cocoa powder analog which can be substituted, 100% on a pound-for-pound basis, for natural cocoa powder, in products where natural cocoa powder conventionally is used. By contrast, the terms "extender," "replacer" and "partial replacer" mean imitation powders exhibiting certain properties of natural cocoa powder, but capable of being used only in combination with natural cocoa powder, without serious reduction in quality.

The term "cocoa powder base," in the present application, means that portion of the cocoa powder analog, minus flavor and fat, which functions to provide bulk and color and which serves as a carrier for the flavor and fat in the preparation of imitation cocoa powder (cocoa powder analog).

One conventional base used for the preparation of so-called cocoa powder replacers or partial replacers has been starch. For instance, prior U.S. Pat. No. 3,625,710 suggests as suitable carriers for chocolate-like flavor a number of materials such as water, ethanol, mineral oil, dextrose, starch or gum arabic. Prior U.S. Pat. No. 3,694,232 contains a similar disclosure describing admixing a chocolate flavoring compound with a carrier such as gum arabic, gum tragacanth, carrageenan and the like, and thereafter spray-drying the resultant mixture to obtain a particulate solid product. Alternatively, the flavor composition can be added to milk solids, sugar and the like. Neither patent teaches the preparation of a product which can be substituted on a 100% pound-for-pound basis for natural cocoa powder and provide in end-use products the same organoleptic and functional properties as natural cocoa powder.

A recently issued U.S. Pat. No. 4,119,740 describes what is referred to as a cocoa extender prepared by roasting peanut grits, almond shells, soybean flakes or mixtures of the same to develop a characteristic cocoa color, and then pulverizing the product to about 200 mesh. The cocoa extender allegedly can be used with cocoa in the proportion of about 99:1 to 1:99, and is said to have the same color, bulk, mouth-feel and flavor as natural cocoa powder.

A manufacturer of products containing natural cocoa powder would prefer, in the use of an imitation product, to be able to replace the natural cocoa powder without in any way having to adjust or vary the formulation. Thus, for example, formulations which deviate significantly in water soluble carbohydrate content from natural cocoa powder tend to be excessively hygroscopic, tend to bloom prematurely in confectioner coatings and exhibit radically different solubility characteristics. Likewise, for example, formulations which deviate significantly in fat content from that found in natural cocoa powders tend to alter coating viscosity, a critical coating parameter which determines the amount of coating deposited. Still further, formulations which deviate significantly in flavor quality from natural cocoa powder, or which do not contain any added flavor, produce coatings which are deficient either qualitatively or quantitatively in desirable flavor characteristics. These are among the reasons that existing art teaches such products can be employed only as extenders or partial replacers.

SUMMARY OF THE INVENTION

The present invention resides broadly in the discovery that an imitation product containing essentially the same carbohydrate, protein, fiber, ash, water and fat content as natural cocoa powder, manufactured from a mixture of finely ground bland flours, fat, flavor and, optionally, colorant, provides in an end-use product essentially the same functional and organoleptic properties obtainable with natural cocoa powders. This is the case even when employed as a 100% pound-for-pound substitute for natural cocoa powder, although the present invention, in its broadest aspect, finds use as a so-called "extender" as well.

Specific applications for the imitation cocoa powder of the present invention include analogs of chocolate liquor, chocolate, confectionery coatings, milk crumb, ice cream flavorings, chocolate drinks and cakes, cookies, etc.

Preferably the present invention resides in a dried powder formulation which comprises, based on the weight, dry basis, of the total formulation;

about 60-85% of a mixture of bland, finely ground, degerminated and/or defatted flours in proportion to provide a carbohydrate content of about 40-65%, a crude fiber content of about 1-10%, a protein content of about 15-30%, and an ash content of about 2-7%;

about 1-25% fat;

said formulation further including water, flavor and colorant, the flavor and colorant being present in effective amounts to substantially duplicate the flavor and color of natural cocoa powder;

said flours having a particle size of less than 200 mesh;

said formulation having a water solubility substantially the same as natural cocoa powder, preferably about 3-5* at 20° C.

Preferably, the fat content of the present invention is substantially added fat. The finely ground and degerminated flours employed in the powder formulation should have a natural fat content not substantially greater than about 3%. It is also preferred that the powder have a water content of less than about 5% to prevent mold growth and hydrolytic rancidity.

*Water solubility for purposes of this application is grams cocoa powder dissolved in 100 grams of water at about 20° C.

The following Table compares the proximate compositions and properties of natural cocoa powder and a representative imitation cocoa powder of the present invention, as obtained by quantitative analysis.

TABLE 3

| Ingredient | Typical Low Fat Natural Cocoa Powder DeZaan N-11-N | Typical Imitation Cocoa Powder Analog |
|---|---|---|
| Carbohydrate | 47 | 53 |
| Fiber | 6 | 1 |
| Protein | 26 | 26 |
| Ash | 5 | 3 |
| Water | 5 | 6 |
| Fat | 11 | 11 |
|  | 100 | 100 |
| Color (L, a, b) | 39 13 16 | 40 12 17 |
| Solubility, grams/ 100 grams H₂O | 4 | 4 |

In a representative example of the present invention, to be disclosed in detail, the bland flours used were wheat, corn and defatted soy flours. These ingredients have the following proximate analysis. All flours were defatted or degerminated.

TABLE 4

| | Proximate Analysis (Wt. Percent) | | | | | |
|---|---|---|---|---|---|---|
| Ingredient | Carbo-hy-drate | Crude Fiber | Protein | Ash | Water | Fat |
| Wheat flour (degerminated) | 73-77 | 0.3-0.5 | 8-16 | ~0.5 | ~12 | 1-1.5 |
| Corn flour (defatted) | 76-79 | 0.5-1.5 | 6-10 | 0.3-1.5 | 11-13 | 2-4 |
| Soy flour (defatted) | 27-33 | 2-3 | 50-55 | 5-6 | 8-10 | 0.5-1.0 |

In Table 4 and elsewhere in the present application, the carbohydrate and crude fiber contents are treated separately, even though crude fiber is a carbohydrate; albeit an indigestible one. The wheat flour is a typical bread flour (as distinguished from a cake flour which would have a slightly lower protein content).

The following Tables 5 and 5a give proportions used, by way of example, based on the weight of the total composition, and the calculated contribution of each ingredient to composition; e.g., crude protein, fat and ash content.

TABLE 5

| Ingredient | Proportion of ingredient in overall product | Protein % | Fat % | Carbohydrate % | Ash % | Crude Fiber % | Water % | Total |
|---|---|---|---|---|---|---|---|---|
| Wheat flour | 35.62 db | 11.8 | 1.1 | 74.4 | 0.4 | 0.3 | 12 | 100% |
| Corn flour | 7.13 db | 7.0 | 2.2 | 78.1 | 0.4 | 0.5 | 11.8 | 100% |
| Soy flour | 29.48 db | 54 | 1.0 | 27.5 | 6 | 3 | 8.5 | 100% |
| Caramel solids | 10.69 db | | | 57 | | | 43 | 100% |
| Red #40 | 0.08 db | | | | | | | |
| Flavor | 1.00 db | | | | | | | |
| Added fat | 10 | | 10 | | | | | |
| Water | 6 | | | | | | 6 | |
| Total | 100% | | | | | | | |

Note: db means dry basis. The caramel was added as a liquid caramel coloring, which is 57% solids and 43% water.

Table 5 gives the proportions used (dry weight basis) of each ingredient and a representative analysis of each ingredient in terms of protein, etc. Table 5a was obtained by multiplying the proportion of each flour ingredient used in the overall product times the protein, etc. content of each ingredient, adjusted for dry weight basis. For instance the protein contribution by wheat flour equals: $0.3562 \times 11.8 \div 0.88* = 4.78$.

*This adjustment to dry basis was obtained by subtracting 12 from 100.

TABLE 5a

| | wheat | corn | soy | caramel | Red #40 | added fat | Equil-Moisture | Total |
|---|---|---|---|---|---|---|---|---|
| Protein | 4.78 | 0.57 | 17.40 | | | | | 22.75 |
| Fat | 0.45 | 0.18 | 0.32 | | | 10 | | 10.95 |

TABLE 5a-continued

|  | wheat | corn | soy | caramel | Red #40 | added fat | Equil-Moisture | Total |
|---|---|---|---|---|---|---|---|---|
| Carbohydrate | 30.12 | 6.31 | 8.86 | 10.69 | 0.08 |  |  | 56.06 |
| Ash | 0.16 | 0.03 | 1.93 |  |  |  |  | 2.12 |
| Crude fiber | 0.12 | 0.04 | 0.97 |  |  |  | 6 | 6 |
| Water | nil | nil | nil |  |  |  |  | 99.01% |

In Table 5a, it can be seen that the total values in the right hand column correspond closely with the actual analysis values of Table 3. The small discrepancies, particularly in protein and ash content, are due to natural variations in flours. The balance from 99.01% (Table 5a, right hand column) to 100% is essentially flavor, not taken into consideration in Table 5a.

Equilibrium moisture is moisture absorbed by exposure to the atmosphere.

In Table 5a, the water contents of the respective ingredients were ignored because one processing step in the present invention is drying, rendering the starting water content irrelevant.

Table 4-5a show that the high carbohydrate wheat flour and corn flour, used in the proportions of about 36 and 7%, respectively, together provided most of the carbohydrate, the balance to an amount closely approximating the carbohydrate content of natural cocoa powder, coming from the high ₁

₄SCN in isopropyl alcohol solvent. Preferably, the grains have a mean particle size less than about 325 mesh, or for optimum mouth-feel, less than about 400 mesh (37 microns). Commercially available flours useful in the composition of the present invention include wheat flour, yellow corn flour, and soy flour. The analyses of these flours were given above in Table 4. Other commercially available flours include pinto navy bean, oat, wheat bran, soy bran, barley and rice bran flours.

These flours have the following analysis (wt. percent):

TABLE 6

| Flour | Carbo-hydrate | Crude Fiber | Protein | Ash | Water | Fat |
|---|---|---|---|---|---|---|
| Pinto navy beans | 58-62 | 2-3 | 21-22 | 5-5.5 | 10-11 | 1-1.5 |
| Oat | 56-60 | 1-2 | 13-15 | 1.8-2.2 | 9-12 | 6-8 |
| Wheat bran | 47-51 | 10-14 | 14-18 | 5-7 | 10-12 | 3-6 |
| Soy bran | 38-42 | 38-42 | 8-12 | 3-5 | 9-12 | 1-2 |
| Barley | 65-69 | 1-3 | 14-18 | 2-4 | 9-12 | 3-5 |
| Rice bran | 48-50 | 6-8 | 17-21 | 10-12 | 9-12 | 1-3 |

The colorant used in the composition of the present invention can be any color commonly employed, to duplicate the color of natural cocoa powder. In a preferred example of the present invention, the coloring is obtained by use of an FDA permanently listed colorant such as caramel (D. D. Williamson 2× Acid Proof Caramel Color #050) in combination with an artificial colorant such as FDC Red. No. 40 (Warner-Jenkenson).

Alternatively, the color can be obtained by what is known as Maillard Reaction which is a non-enzymatic browning of reducing sugars and amino acids.

If natural browning is employed, duplication of the color of natural cocoa powder may require no additional coloring or, depending on the flours used, can be complemented by the addition of some colorant. Normally, less than 20% (dry basis) of a colorant would be needed. Thus, an effective amount of colorant can be zero to about 20%, the higher limit giving a darker color such as found in dutched cocoa.

The caramel color has the advantage that it is a carbohydrate and contributes to the carbohydrate content of the product offering some flexibility in the proportioning and selection of flours, as natural cocoa powder is very high in carbohydrate content. It is neutral in flavor and odor, is water soluble, and does not adversely affect the viscosity of a confectionary coating prepared with the imitation cocoa powder of the present invention. Further, it is slightly acidic and can advantageously be employed to duplicate the pH of natural cocoa powder. Instead of caramel color, other carbohydrate-containing colors with or without added acidulants could also be used to achieve similar results.

The present invention also resides broadly in the formulation of a cocoa powder base, defined as a mixture of flour components having in combination approximately the carbohydrate, protein, ash and fiber content found in natural cocoa powder. Specifically, the present invention resides in a blend of finely ground, bland, defatted or degerminated flours and colors in combination providing about 40–70% carbohydrate, about 20–35% protein, about 2–7% ash, and about 1–10% fiber; a fat content of less than about 3%; and a water content of less than about 5%.

It can be seen that the cocoa powder base is the imitation cocoa powder composition for instance of Table 5, minus added fat and flavor. By way of example, the base for the composition of Table 5 would have the following composition:

TABLE 7

| Ingredient | Percent |
| --- | --- |
| Wheat Flour | 41.12 db |
| Corn Flour | 8.25 db |
| Soy Flour | 34.21 db |
| Caramel Solids | 12.33 db |
| Red #40 | 0.09 db |
| Water | 4.00 |
| Total | 100.00 |

Note:
db means dry basis

Contributions of the ingredients to the base, by calculation, then, is as follows:

TABLE 7a

| | Wheat | Corn | Soy | Caramel | Red #40 | Equil-Moisture | Total |
| --- | --- | --- | --- | --- | --- | --- | --- |
| Protein | 5.51 | 0.65 | 20.19 | | | | 26.35 |
| Fat | 0.51 | 0.21 | 0.37 | | | | 1.09 |
| Carbohydrate | 34.77 | 7.31 | 10.28 | 12.33 | 0.09 | | 64.78 |
| Ash | 0.19 | 0.04 | 2.24 | | | | 2.47 |
| Crude Fiber | 0.14 | 0.05 | 1.12 | | | | 1.31 |
| Water | nil | nil | nil | | | 4 | 4 |
| Total | | | | | | | 100% |

By using defatted or degerminated flours, the fat content can be replaced with a fat having the characteristics desired. One specific criteria is use of a fat which is stable against rancidity over a reasonable shelf period (e.g., 6 months). This criteria can be met by employing a cocoa powder base in which the natural fat content is less than about 3%.

In other regards, the particular fat employed in the imitation cocoa powder formulation of the present invention is dependent primarily on the application involved, and in its broadest respect can be any liquid stable edible oil or solid fat capable of being blended with the flour. For instance, the fat can be a vegetable fat, or it can be an animal fat. Preferably, the fat is a solid fat known in the art as a hard butter. Examples of suitable oils which can be employed in the imitation cocoa powder of the present invention are Durkex 100 (trademark, SCM Corporation), a partially hydrogenated soybean oil having a Wiley Melting Point of about 65° F. (max.). Another suitable oil is Cirol (trademark, SCM Corporation), a partially hydrogenated vegetable oil from cottonseed and soybean oil having a Wiley Melting Point of about 91°–95° F.

For confectionary applications, the fat should be a hard butter having a Wiley Melting Point in the range of about 92°–108° F.; should have a high solids content of at least about 50% at 50° F.; and a low solids content not substantially greater than about 26% at 92° F. The fat should have a shoulder or sharp drop-off in SFI between about 70° F. and 92° F. and preferably drops to an SFI not substantially greater than 13 at 100° F. Suitable such fats which may be employed in the composition of the present invention are: cocoa butter—obtained by pressing the ground-up cocoa bean nib in hydraulic presses. WMP of about 92° F.; SFI of about 83 at 50° F., and 5 at 92° F.

Kaomel (trademark, SCM Corporation)—a partially hydrogenated vegetable oil having a Wiley Melting Point of 97°–100° F. and an SFI (solid-fat index) of about 72 at 50° F., and 21 at 92° F.

Satina II (trademark, SCM Corporation)—a fractionated vegetable oil having a Wiley Melting Point of 93°–97° F. and an SFI of about 69 at 50° F. and 4.5 at 92° F.

Choco-Mate (trademark, SCM Corporation)—a partially hydrogenated, fractionated vegetable oil having a Wiley Melting Point of about 102° F., and an SFI of about 78 at 50° F. and 70° F.; 74 at 80° F.; 35 at 92° F.; and 0 at 100° F.

CBE 15 (trademark, SCM Corporation)—a fractionated vegetable oil having a Wiley Melting Point of about 99° F., and an SFI of about 74 at 50° F. and 6 at 92° F.

Coberine (trademark, Loders & Nucoline, Ltd.)—a fractionated vegetable oil having a Wiley Melting Point of about 92°–95° F.; and an SFI of about 80 at 50° F., and 8 at 92° F.

Preferably for other applications suitable plastic fats and liquid oils may be employed in the composition of the present invention.

Creamtex (trademark, SCM Corporation)—a partially hydrogenated vegetable shortening having a Wiley Melting Point of 112°–119° F.

Durkex 500 (trademark, SCM Corporation)—a partially hydrogenated, fractionated vegetable oil having a Wiley Melting Point of 73° F. max.

Any cocoa flavor commercially available can be employed in the composition of the present invention, suitable such flavors including;

Monsanto Artificial Chocolate Flavor #8620
Firmenich Artificial Chocolate Flavor #F5377A
Naarden Artificial Chocolate Flavor #RR72344
IFF Natural and Artificial Chocolate Flavor #X16886.

Still further, the present invention resides in confectionary, dairy and bakery products including analogs of chocolate liquor, drink mixes and cakes prepared from an imitation cocoa powder comprising about 60–80% of a mixture of bland, finely ground flours in proportion to provide a carbohydrate content of about 40–65%, a crude fiber content of about 1–10%, a protein content of about 15–30%, and an ash content of about 2–7% about 1–25% fat; the remainder being essentially water, flavor and colorant, the flavor and colorant being present in effective amounts to substantially duplicate the flavor and color of natural cocoa powder, said products having essentially the same organoleptic and functional properties as such products containing natural cocoa powder.

Still further, the present invention resides broadly in the method for the preparation of the imitation cocoa powder comprising the steps of;
 dry blending the above finely ground flours;
 mixing the same with colorant and water in sufficient amount to form a substantially homogeneous paste;
 extruding said paste;
 subjecting said paste to drying and milling to fine particle size; and
 uniformly applying fat and flavor to said particles, the proportions of ingredients being as aforesaid stated.

Preferably drying is carried out to a water content, as indicated above, of less than about 5%, by weight of the total formulation. This is important to prevent mold growth and hydrolytic rancidity of the fat content of the imitation cocoa powder of the present invention, and also of the confectionary, diary and bakery products of the present invention.

EXAMPLE 1

This example illustrates preparation of an imitation cocoa powder product in accordance with the concepts of the present invention.

In this example, the following imitation cocoa base was employed:

| Ingredients | Percent by Weight |
|---|---|
| Wheat flour, degerminated (wb) | 32.24 |
| Corn flour (yellow), defatted (wb) | 6.45 |
| Soy flour, defatted (wb) | 25.79 |
| Liquid caramel color (Williamsons Double Strength) | 14.93 |
| Red Color No. 40 | 0.06 |
| Water (added) | 20.53 |

Note:
wb means wet basis, including equilibrium moisture

The wheat flour, corn flour and soy flour were mixed by dry blending in a Hobart Mixer (trademark) fitted with a flat paddle. A dispersion of the colorants in added water was then mechanically mixed into the dry blend, with continued mixing in the Hobart Mixer, forming a thick mass which was subsequently extruded through a meat-type grinder onto a pan in spaghetti-like ribbons. The extruded product which was well mixed and homogeneous in color was then dried at about 250° F. in an oven, for 1½ hours, until a brittle consistency was obtained. The dry base was then pulverized to a very fine particle size; 50% less than about 10 microns as determined by a Coulter Counter; approximating the conventional particle size of cocoa powder. This gave the cocoa powder base described above in Tables 7 and 7a although it should be understood that the data of Table 7a was calculated data and actual analyses may differ somewhat, depending on flours used.

Following preparation of the cocoa powder base, artificial chocolate flavors in liquid form were sprayed as a fine mist onto the constantly agitated base. The amount of flavor added to the base depends upon the type and intensity of flavor desired. In this example, the following formulation was employed:

| Ingredients | Percent by Weight |
|---|---|
| Imitation cocoa powder base | 96.20 |
| Artificial chocolate flavors (Monsanto #8620) | 3.80 |

This product may then be blended with a hard butter such as Satina II NT (trademark, SCM Corporation). To produce a low fat product, 10–12% hard butter should be employed. About 13–15% fat gives a medium fat product and about 19–21% fat gives a high fat product. The fat can be added by melting the fat and then slowly incorporating it into the flavored base with efficient mechanical agitation.

The imitation cocoa powder of this example had about 10% added fat and a carbohydrate, fiber, protein, fat, ash and water content approximating that of natural cocoa powder, weight % as set forth in the above Table 3.

In comparative tests conducted employing the imitation cocoa powder, the powder was found to have a water solubility of about 4 grams/100 grams of water at 20° C., approximately the same as that of natural cocoa powder (about 4@20° C.). In terms of mouth-feel, aroma, flavor, and color, no significant difference between the imitation cocoa powder of the present invention and natural cocoa powder was detected.

EXAMPLE 2

This example illustrates an application for the imitation cocoa powder of the present invention.
The following formulation was employed:

| Ingredients | Percent by Weight |
|---|---|
| Imitation cocoa powder (12% fat) | 6.00 |
| Sugar | 42.45 |
| Whole milk powder | 8.00 |
| Non-fat milk solids | 12.00 |
| Hard butter-Satina IINT, trademark, SCM Corporation; WMP 95°–97° F.; 72–74 SFI at 50° F.; 6 max. SFI at 92° F. | 31.00 |
| Salt | 0.10 |
| Methyl vanillin | 0.05 |
| Lecithin | 0.40 |

The above composition is useful as an imitation confectionery coating.

Two confectionery coatings, prepared using standard procedures conventional in the industry, provided the following comparative results. One coating contained the imitation cocoa powder of Example 1, the other a DeZaan natural low fat cocoa powder N-11-N.

| Color Measurements | Imitation Cocoa Powder Example 1 | DeZaan Cocoa Powder |
|---|---|---|
| L | 39.7 | 38.0 |
| a | 11.5 | 11.3 |
| b | 16.7 | 14.3 |
| Viscosity (Degrees MacMichael) | 63 | 68 |

| Color Measurements | Imitation Cocoa Powder Example 1 | DeZaan Cocoa Powder |
|---|---|---|
| at 120° F.) | | |

The mouth-feel and flavor of the confectionery coating manufactured using the imitation cocoa powder of the present invention compared very favorably with that manufactured using the DeZaan natural cocoa powder.

EXAMPLE 3

This example is an imitation chocolate liquor.

| Ingredients | Percent by Weight |
|---|---|
| Imitation cocoa powder (12% fat) | 48.0 |
| Hard butter (Satina II NT) | 52.0 |

EXAMPLE 4

An imitation milk crumb was prepared using the following formulation:

| Ingredients | Percent by Weight |
|---|---|
| Imitation cocoa powder (12% fat) | 6.48 |
| Hard butter (Satina II NT) | 11.52 |
| Sugar | 63.00 |
| Non-fat milk solids | 18.00 |
| Moisture | 1.00 |

EXAMPLE 5

The purpose of this example is to illustrate that browning of the imitation cocoa powder of the present invention can be obtained employing the Maillard Reaction between amino acids and reducing sugars in lieu of added natural or artificial colors.

Testing of various flour blend and water mixtures indicates that the imitation cocoa powder base formulation illustrated in Table 5 develops cocoa-like colors when heated at 200°–350° F. for two hours. The browning reaction utilizes the reducing sugars and amino acids indigenous to the flour blend. To accelerate and intensify the Maillard Reaction, subsequent tests were conducted on flour blend/water slurries containing added reducing sugars such as dextrose, lactose, and fructose. These slurries were oven dried in a Proctor & Schwartz Forced Air Oven at 200°–300° F. for $\frac{1}{3}$–$1\frac{1}{2}$ hours. The dried slurries were then pulverized in a Weber Bros. hammer mill and combined with melted hard butter to a level of 11% fat. Some of the samples developed dark brown color. Fructose affected the color development process more than lactose or dextrose.

To further illustrate effects of Maillard Reaction browning in the present invention, the following Table 8 lists the color of a natural cocoa powder and several examples of imitation cocoa powder, containing no added color, as measured by a Hunterlab Color Difference Meter.

TABLE 8

| Powders | Slurry Composition | Oven Temp. (°F.) | Drying Time (min.) | Color Values[1] L | a | b |
|---|---|---|---|---|---|---|
| DeZaan Natural Low Fat Cocoa Powder N-11-N | — | — | — | 40.5 | 12.5 | 15.6 |
| 5247-11-2 | 100% flour blend | No Oven Heating | | 84.9 | −0.1 | 21.8 |
| 5247-1-7 | 73% flour/27% water | 240 | 20 | 79.0 | 1.9 | 23.3 |
| 5247-1-9 | 73% flour/27% water | 300 | 20 | 70.6 | 7.0 | 28.5 |
| 5247-1-10 | 64.5% flour/8.5% fructose/27% water, | 300 | 20 | 34.6 | 12.3 | 16.0 |

[1]L measures "lightness" and varies from 100 for perfect white to zero for black, approximately as the eye would see it.
a measures "redness" when plus; gray when zero and "greenness" when minus.
b measures "yellowness" when plus; gray when zero and "blueness" when minus.

Color reflectance data of Table 8 indicates that cocoa-like pigmentation, through the Maillard Reaction, can be induced in imitation cocoa powder without addition of natural or artificial colors. It is obvious to one skilled in the art that Maillard induced pigmentation and natural or artificial colors may be used in combination to color the imitation cocoa powder.

EXAMPLE 6

This example illustrates the preparation of the imitation cocoa powder of the present invention employing only two powders. The cocoa powder formulation contains:

| | Approx. % |
|---|---|
| Soy Flour | 27 db |
| Wheat Bran Flour | 54 db |
| Added Fat | 7.4 db |
| Caramel Color (solids) | 6.52 db |
| FD&C Red #40 | 0.08 |
| Artificial Chocolate Flavor | 1 |
| Moisture | 4 |
| | 100% |

The soy flour is the same as in Example 1. The wheat bran flour has the composition set forth in Table 6. Multiplying the above percentages for soy flour and wheat bran flour by the analyses for soy flour and wheat bran flour, one obtains the following contribution of the respective ingredients to the overall cocoa powder composition:

TABLE 9

| | Soy Flour | Wheat Bran Flour | Caramel Color | Red #40 | Added Fat | Equil-Moisture | Total |
|---|---|---|---|---|---|---|---|
| Protein | 15.93 | 9.76 | | | | | 25.69 |
| Fat | 0.30 | 2.81 | | | 7.4 | | 10.51 |
| Carbohydrate | 8.11 | 30.45 | 6.52 | 0.08 | | | 45.16 |
| Ash | 1.77 | 3.66 | | | | | 5.43 |

TABLE 9-continued

|  | Soy Flour | Wheat Bran Flour | Caramel Color | Red #40 | Added Fat | Equil-Moisture | Total |
|---|---|---|---|---|---|---|---|
| Crude Fiber | 0.89 | 7.32 |  |  |  |  | 8.21 |
| Moisture | — | — |  |  |  | 4 | 4 |
|  |  |  |  |  |  |  | 99.00% |
| Flavor |  |  |  |  |  |  | 1.00 |
|  |  |  |  |  |  |  | 100.00% |

Processing of the formulation to a cocoa powder base is as set forth in Example 1. Table 9 includes the contributions of added fat and caramel.

This Example is not preferred as the wheat bran flour is a relatively expensive commodity as compared to the commodities employed in Example 1. However, the Example illustrates the use of two flours in the practice of the present invention.

Examples of carbohydrate-containing colorants which can be used, in addition to caramel, are vegetable derived colors such as oleoresin paprika, available in lipid form, and turmeric and annatto, both available in dry crystalline form.

What is claimed is:

1. An imitation cocoa powder formulation having essentially the same physico-chemical and functional properties as natural cocoa powder, capable of replacement of natural cocoa powder on a 100% pound-for-pound basis in applications traditionally using cocoa powder comprising based on the weight, dry basis, of the total formulation;
   about 60-85% of a mixture of bland, finely ground, degerminated and/or defatted flours in proportion to provide a carbohydrate content of about 40-65%, a crude fiber content of 1-10%, a protein content of about 15-30%, and an ash content of about 2-7%;
   about 1-25% fat;
   the remainder being essentially water, flavor and colorant, the flavor and colorant being present in effective amounts to substantially duplicate the flavor and color of natural cocoa powder;
   said formulation having a water solubility approximately the same as for natural cocoa powder.

2. The formulation of claim 1 wherein said flours are low in fat content, and said colorant at least in part is carbohydrate.

3. The formulation of claim 2 wherein said colorant is caramel.

4. The formulation of claim 1 wherein said fat is substantially added fat, defined as fat added in addition to the natural fat content in said flours; said natural fat content being less than about 3% based on the weight of the flours.

5. The formulation of claim 4 wherein said added fat is a hard butter, a plastic shortening or a liquid oil.

6. A method for the preparation of the imitation cocoa powder formulation of claim 1 comprising browning the flours by the Maillard Reaction.

7. The formulation of claim 1 wherein said flours have a particle size less than about 200 mesh, said formulation having a water content of less than about 5%.

8. The formulation of claim 4 suitable for a confectionery coating wherein said added fat is a hard butter present in the proportion of about 10-21%.

9. The formulation of claim 8 wherein said hard butter has a Wiley Melting Point in the range of about 92°-108° F.; a high solids content (SFI) of at least about 50% at 50° F.; and a low solids content not substantially greater than about 26% at 92° F.

10. The formulation of claims 1, 2, 3, 4, 5, 6, 7, 8 or 9 prepared by
    dry blending said finely ground flours;
    mixing said flours with water and zero to a coloring amount of a colorant, in sufficient amount to form a substantially homogeneous paste;
    extruding said paste;
    subjecting said paste to drying and milling to fine particle size; and
    uniformly applying fat and flavor to said particles.

11. The formulation of claim 10 dried to a water content of less than 5% based on the weight of the total formulation.

12. The cocoa powder formulation in any one of claims 1-9 wherein said flours are derived from edible source materials selected from the group consisting of; grains from members of the grass family; bean flours; tuberous flours; and nut flours.

13. The cocoa powder formulation of claim 12 wherein at least one of said flours has a high carbohydrate content and a relatively low protein content, and at least one of said flours has a relatively high protein content and lower carbohydrate content, said flours being present in the proportions to provide the carbohydrate, fiber, protein and ash contents stated.

14. The cocoa powder formulation in any one of claims 1-9 wherein said flours are a blend of wheat flour, corn flour and soy flour in proportions to provide the carbohydrate, fiber, protein and ash contents stated.

15. A method of preparing an imitation cocoa powder formulation having essentially the same physio-chemical and functional properties as natural cocoa powder, capable of replacement of natural cocoa powder on a 100% pound-for-pound basis in applications traditionally using cocoa powder comprising the steps of
    mixing together about 60-85% based on the total formulation weight of a blend of finely ground degerminated and/or defatted bland flours in proportions sufficient to provide approximately the same carbohydrate, fiber, protein and ash contents as in natural cocoa powder, said contents being about 40-65% carbohydrate, about 1-10% crude fiber, about 15-30% protein, and about 2-7% ash based on the flour weight;
    said blend containing about 1-25% fat based on the total formulation weight as either added fat or existing fat in said flours; and
    adding to said blend colorant and flavor in effective amounts to substantially duplicate the color and flavor of natural cocoa powder.

* * * * *